T. Coldwell,

Stripping File-Blanks.

N° 57,869. Patented Sep. 11, 1866.

Witnesses.

Inventor.

UNITED STATES PATENT OFFICE.

T. COLDWELL, OF MATTEAWAN, NEW YORK.

IMPROVED APPARATUS FOR STRIPPING FILES.

Specification forming part of Letters Patent No. 57,869, dated September 11, 1866.

*To all whom it may concern:*

Be it known that I, T. COLDWELL, of Matteawan, in the county of Dutchess and State of New York, have invented new and useful Improvements in Machines for Stripping File-Blanks; and I do hereby declare that the following is a full, clear, and exact description thereof, which will enable others skilled in the art to make and use the same, reference being had to the accompanying drawings, forming a part of this specification.

The present invention relates to a machine to be used for the purpose of "stripping," so-called, file-blanks, or, in other words, to prepare them for being cut; and it consists, first, in a novel arrangement and construction of the holder for the file-blanks while being subjected to the action of the tool employed for stripping them, the said holder being so constructed as to receive and hold blanks of varying lengths, and also so arranged that while the file-blanks will be firmly held to the action of the stripping-tool used, they can adjust themselves thereto, as will be hereinafter fully explained; second, in imparting to the stripping-tool used a reciprocating rectilinear movement over the file-blanks in the direction of their length in such a manner that without arresting the movement of the stripping-tool the blanks can be removed from the machine and reversed in position, or new ones inserted, according as may be desired; third, in arranging and connecting the holder for the file-blanks with the driving-shaft of the machine or the power used for driving it in such a manner as to cause the blank-holder to have a reciprocating rectilinear movement across the plane of movement of the stripping-tool, the object being to secure a uniform wear of the said tool through its whole length.

Having thus generally stated the nature and principles of the present invention, I will now proceed to describe the same in detail, reference being had to the accompanying plate of drawings, in which—

Figure 2:
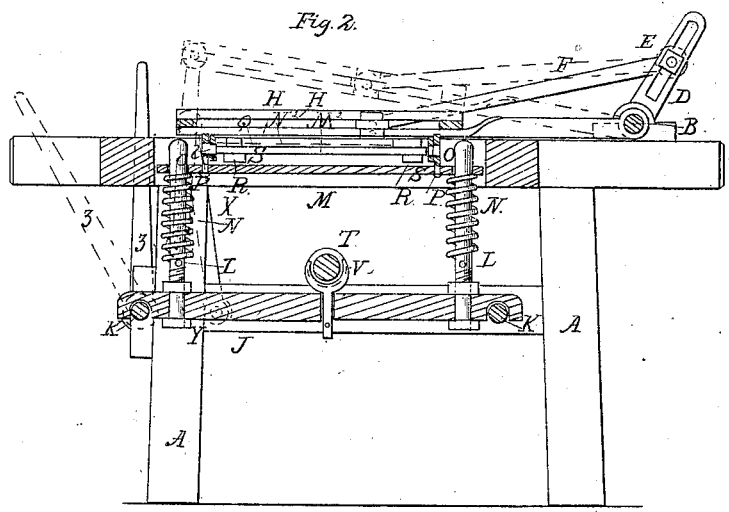
Figure 1:
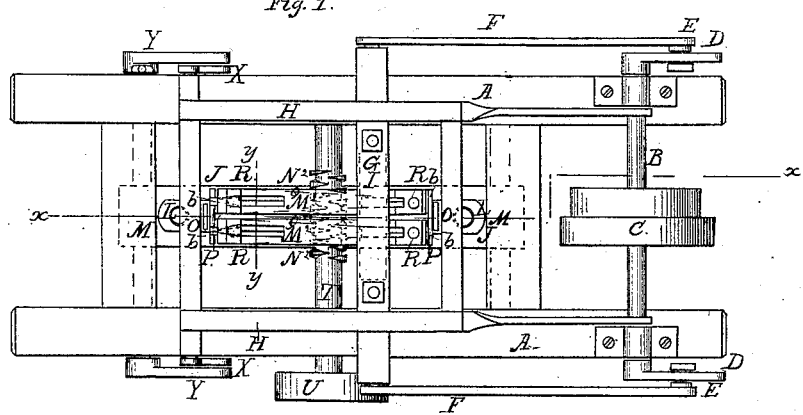
Figure 3:

Figure 1 is a plan or top view of the machine; Fig. 2, a longitudinal vertical section, taken in the plane of the line *x x*, Fig. 1; and Fig. 3, a section, in detail, taken in the plane of the line *y y*, Fig. 1.

Similar letters of reference indicate like parts.

A in the drawings represents the frame-work of the machine, made of suitable form and construction to receive the working and operating parts of the machine, and having at one end, turning in suitable bearings thereof, a transverse horizontal shaft, B, to a pulley, C, of which the driving-power used is to be connected in any suitable manner. On each end of the horizontal shaft B is a similar slotted crank-arm, D, in which slots of the said arms one end, E, of connecting-rods F are fastened by means of a screw-bolt and nut, or in any proper manner, the other ends of said rods being hung or pivoted to the outer ends of a transverse horizontal bar or plate, G, arranged and moving in parallel horizontal guide-bars H H, extending in the direction of the length of the frame-work A, and hung at one end to the transverse shaft B, hereinbefore referred to, so that it can swing thereon.

To the under side of the plate or bar G, and in the direction of its length, the tool I, to be used for the stripping of the file-blanks, is secured by means of bolts and nuts, or in any other suitable manner.

The stripping-tool which I intend to use is an ordinary file made with the proper shape or size of teeth.

J is a horizontal board or frame, placed in the lower portion of the frame-work A, and extending in the direction of its length, resting at each end upon a transverse horizontal shaft, K, in such a manner that the frame or board can be slid or moved forward upon the same.

At or near each end of the frame J is an upright post or rod, L, over the upper ends of which is placed a straight horizontal bar or plate, M, resting upon a spiral spring, N, of each post. O are uprights at or near each end of plate M, upon its upper side, to the inside of each of which uprights a plate, P, is swiveled, extending across the width of the frame M.

$N^2$ are the holders for the file-blanks, hung alongside of each other by a trunnion-pin, *b*, of each end in the swiveled plates P of the uprights O, with the file-blanks held by them upon their upper side.

Q Q are the file-blanks, one to each holder, in which, at each end, they are securely held and bound, in the direction of their length, by and between two sliding clutches, R R, one at each end, moving in slots at their respective ends of the bar $M^2$, screw-nuts S being used for holding the said clutches in position.

The file-blanks, when placed in the holders, and they in turn hung in the frame M, are below the stripping-tool, and in position for it (as it is moved forward and backward within the side guide-bars for the same, through the parts connecting it with the driving-shaft of the machine) to act upon them, as is plain to be seen by an inspection of the drawings and from the above description, without any further explanation, the spiral springs upon which the holder-frame rests retaining the file-blanks in position for being operated upon by the stripping-tool, while at the same time the blank-holders are rendered entirely self-adjustable to the stripping-tool, as is obvious.

In order to produce an even and uniform wear of the stripping-tool used through its whole length, the frame in which the blank-holders are arranged is made to move across the width of the frame-work of the machine, or in a plane at right angles to the play of the stripping-tool, thus causing the file-blanks carried by such frame to be submitted to the action of all portions of the stripping-tool, by means of a right-and-left-screw-threaded transverse horizontal shaft, T, turning in bearings at each end of the side pieces of the frame-work, with a pulley, U, at one end, to which the driving-power used is to be connected in any proper manner. This shaft passes over the lower horizontal bar or plate, J, of the holder-frame, on the upper side of which is swiveled a half-nut, V, at the proper point for interlocking or engaging with the right-and-left screw-thread of the shaft T, whereby, as is plain to be seen, the frame carrying the holders for the file-blanks, as the said shaft T is revolved, will necessarily be moved forward and backward across the machine, the right-and-left-threaded screw being suitably formed at each end to reverse the position or direction of the swiveled nut at the proper times.

To permit the file-blanks to be removed from the machine without arresting its movement, I raise the frame in which the stripping-tool is guided forward and backward over the file-blanks from the file-holders (the frame swinging by its arms or side pieces or strips upon the driving-shaft) by connecting the outer ends of such side pieces, through connecting-rods X X, with the outer ends of crank-arms Y Y of one of the horizontal shafts or rods hereinbefore referred to, upon which the blank-holder frame moves, so that if the handle-lever Z of such shaft be depressed the stripping-tool frame will be raised, and vice versa, if the handle is swung upward.

The length of play or movement of the stripping-tool may be varied at pleasure, according to the length of the file-blanks upon which it is to operate by simply changing the position of the connecting-rods within the slots of the slotted crank-arms—that is, bringing them nearer to or farther from the center of rotation of their common shaft.

What I claim as new, and desire to secure by Letters Patent, is—

1. The reciprocating sliding stripping-tool I, arranged and operating with holders $N^2$ substantially as described, for the purpose specified.

2. In combination with the above, the frame or guideway H H for the stripping-tool, hung so as to allow the said tool to be lifted from the file blank or blanks upon which it is operated without arresting its movement, substantially as and for the purpose specified.

3. The holders $N^2$ for the file-blanks, having sliding adjustable clutches K at each end for securing the blanks in place for the same, substantially as and for the purpose specified.

4. Swiveling the blank-holders $N^2$ to the frame M, supported upon spiral springs N, or their equivalents, at each end, as and for the purpose described.

T. COLDWELL.

Witnesses:
 M. M. LIVINGSTON,
 ALBERT W. BROWN.